Feb. 14, 1933.        C. A. DOMZALSKI         1,897,927
BLOW-OUT PATCH
Filed Oct. 26, 1931
Fig. 1.
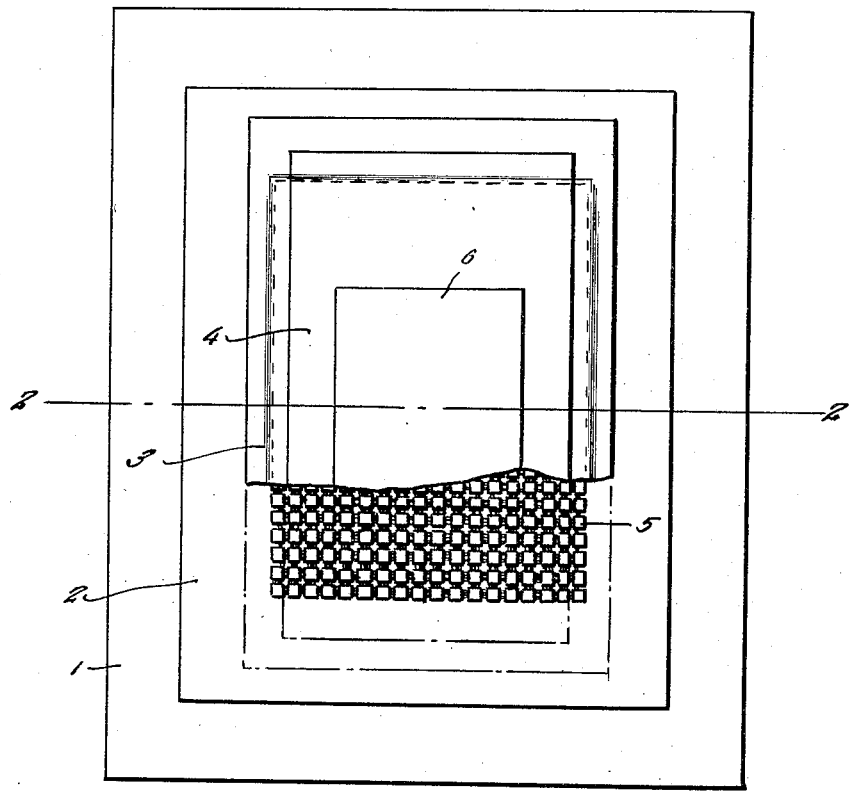
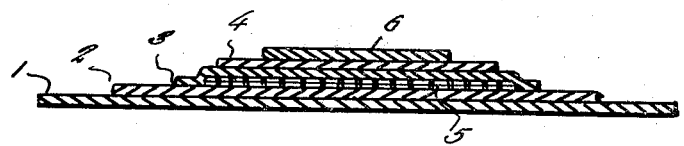
Fig. 2.
C. A. Domzalski, Inventor
By Clarence A. O'Brien, Attorney Patented Feb. 14, 1933

1,897,927

UNITED STATES PATENT OFFICE

CASIMIR A. DOMZALSKI, OF DETROIT, MICHIGAN

BLOW-OUT PATCH

Application filed October 26, 1931. Serial No. 571,204.

The present invention relates to new and useful improvements in blow out patches for pneumatic tires and has for some of its objects to provide, in a manner as hereinafter set forth, a device of this character which will be simple in construction, strong, durable, efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in top plan of a blow out patch in accordance with the present invention, portions of the upper laminations being broken away to show the reinforcing elements.

Figure 2 is a view in cross section taken substantially on the line 2—2 of Figure 1.

Referring now to the drawing in detail, it will be seen that the blow out patch constituting the present invention comprises a series of substantially pyramided fabric laminations or layers 1, 2, 3 and 4 which are secured together and entirely enclosed in a suitable rubber compound with the exception of the lower side of the base lamination or layer 1.

Enclosed between the laminations 2 and 3 is a reinforcing element 5 which, in the embodiment of the invention illustrated, is in the form of a plurality of small flat linked together metallic plates. The reinforcing element 5 is embedded in the rubber compound which connects the laminations 2 and 3 together. The marginal portions of the lamination 3 extend over the edges of the reinforcing element 5 and are secured to the lamination 2. The reference numeral 6 designates a layer of pure gum or uncured rubber which is secured in position by adhesion on the top lamination 4.

The patch may comprise any desired number of laminations and, while the patch illustrated is substantially rectangular in plan, it is to be understood that the same may be of any desired shape. Also, it is not necessary that the laminations be substantially centrally disposed with respect to each other, as illustrated in the drawing.

In making the blow out patch, the base lamination 1 and the adjacent lamination 2 are joined together by the rubber compound. The reinforcing element 5 is then positioned on the lamination 2 and is covered by the rubber compound after which laminations 3 and 4 are positioned. The patch is then subjected to pressure in any suitable manner with the result that the rubber compound is forced through the spaces in the reinforcing element 5 and a strong joint is provided between the laminations. The layer 6 is then positioned on the lamination 4.

In applying the patch to the tire, the inside of the casing is washed with gasoline. The patch is so placed that the layer 6 will fit over and into the break in the casing. Then, the tire may be subjected to vulcanization or the tube may be replaced in the casing without the vulcanization. When the latter method is used, the heat generated in the tire when in use will serve to vulcanize the patch and to cause said patch to adhere permanently to the inner walls of the casing.

It is believed that the many advantages of a blow out patch in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A blow out patch of substantially pyramidal cross section and comprising a plurality of fabric laminations gradually decreasing in size from the bottom to the top, a reinforcing element comprising a plurality of flat, metallic linked together members interposed between certain of the laminations, said metallic element being of smaller size than the lamination directly above it whereby the edges of said lamination contact the lamination directly below the metallic lamination, a rubber compound enclosing the laminations with the exception of the free side of the lowermost lamination, for securing said laminations together and for securing the reinforcing element in position, and a layer of uncured rubber on the uppermost lamination.

In testimony whereof I affix my signature.

CASIMIR A. DOMZALSKI.